Figure 1:
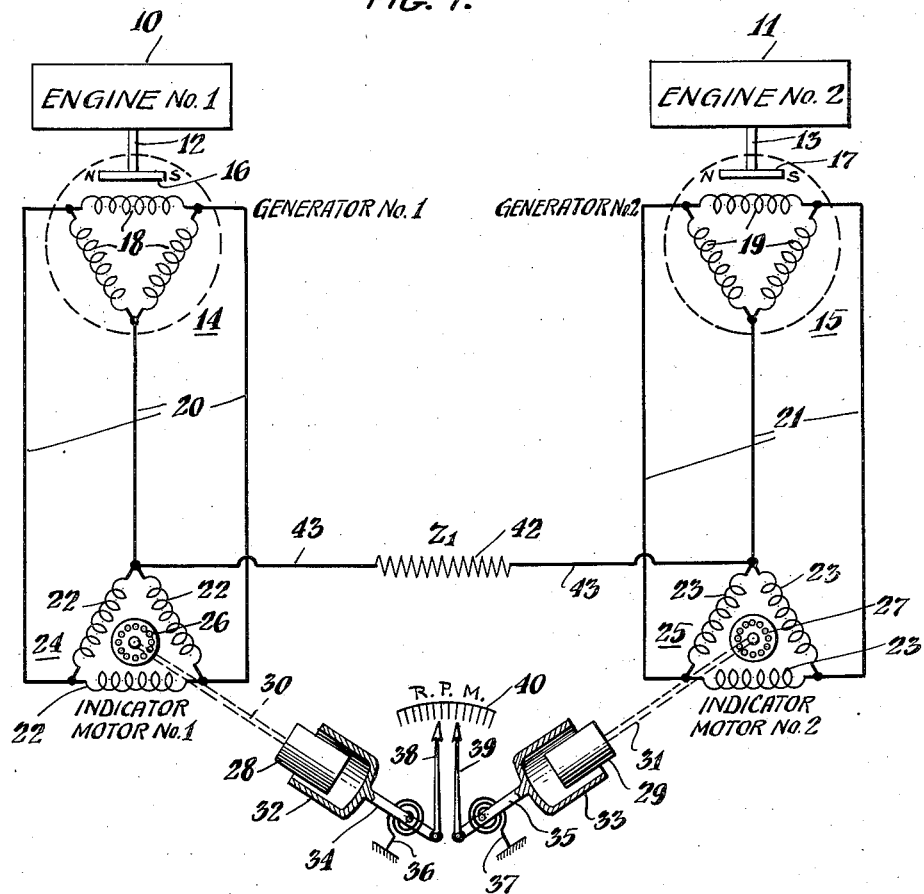

Jan. 18, 1944.   P. F. BECHBERGER   2,339,612
SYNCHROSCOPE
Filed May 23, 1942   2 Sheets-Sheet 1

INVENTOR:
PAUL F. BECHBERGER.
BY
*C. Kalman*
ATTORNEY.

Jan. 18, 1944.  P. F. BECHBERGER  2,339,612
SYNCHROSCOPE
Filed May 23, 1942   2 Sheets-Sheet 2
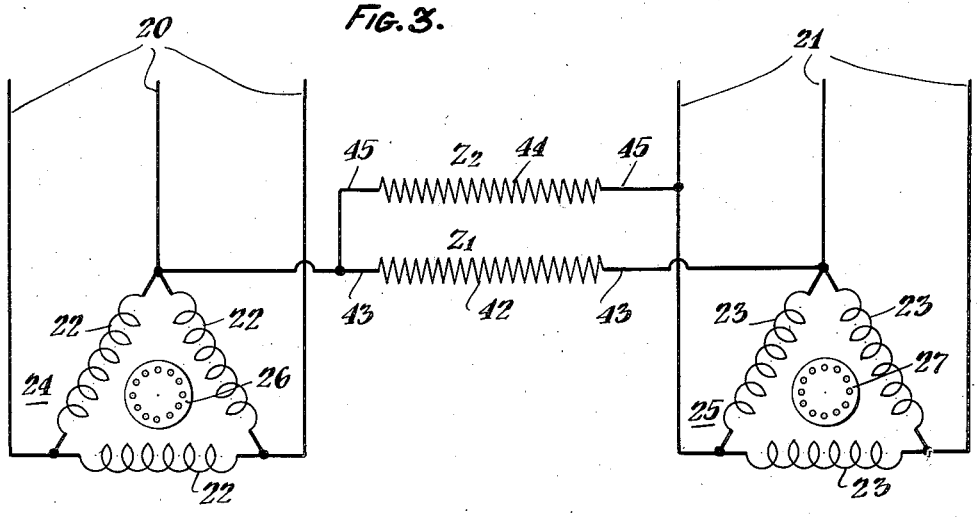
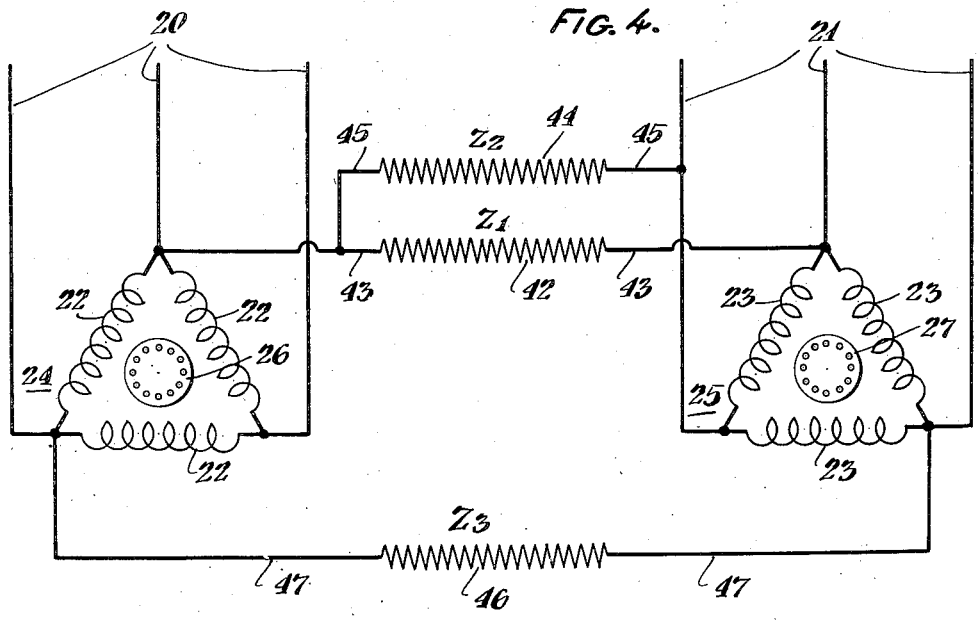
INVENTOR:
PAUL F. BECHBERGER,
BY
ATTORNEY.

Patented Jan. 18, 1944

2,339,612

UNITED STATES PATENT OFFICE 2,339,612

SYNCHROSCOPE

Paul F. Bechberger, Tenafly, N. J., assignor to Bendix Aviation Corporation, Bendix, N. J., a corporation of Delaware Application May 23, 1942, Serial No. 444,283

7 Claims. (Cl. 177—311)

This invention relates to indicating apparatus generally, and more particularly to devices for indicating the relationship between the speeds of rotation of a plurality of rotating members, such as internal combustion engines, installed on an aircraft or the like, which are subject to variation in speed.

The known and prevailing practice has been to provide aircraft with remote indicating tachometers for ascertaining the speed of rotation of each of the aircraft's engines. Where speed variation of one or more of the engines relative to the others is considerable these tachometers are dependable enough to inform the pilot of such fact so that he may throttle the engine or engines concerned to re-establish the desired speed relation between the engines. Because of the limits of accuracy of any of the known tachometer systems, however, the instruments are not reliable for all conditions for the reason that the various tachometers may indicate substantially the same speed for all of the engines whereas, in fact, one or more of the engines may be leading or lagging behind the others by some twenty (20) or twenty-five (25) revolutions per minute.

It is an object of the present invention, therefore, to overcome the foregoing disadvantages and to increase the accuracy of known tachometer systems to the extent that any variation in the speed of one or more of a plurality of engines will be indicated immediately.

Another object of the invention is to provide a novel, simple and reliable synchroscope for indicating the speed relationship between two rotating members or engines.

A further object of the invention is to provide a novel apparatus for indicating the speed relationship of two engines consisting of a separate tachometer for each engine, the tachometers being interconnected in a novel manner through one or more electrical impedances so that with a speed variation of one engine relative to the other, the tachometer indicators are caused to "beat," that is, to move up and down on the dial once per cycle difference of the engine generators.

Another object of the invention is to provide a novel electrical interconnection between two tachometer systems so that the latter are thereby converted into a desirable and reliable synchroscope.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention, reference for this latter purpose being had to the appended claims.

Figure 2:
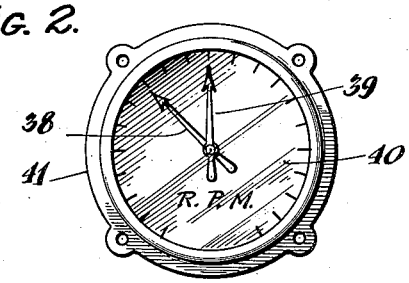

In the drawings, wherein like reference characters refer to like parts throughout the several views;

Figure 1 is a schematic view of two tachometer systems incorporating the subject matter of the present invention, Figure 2 is a front view of a dual indicator adapted for use with the apparatus of Figure 1, Figure 3 is a fragmentary view of a portion of the apparatus of Figure 1 illustrating a second embodiment of the present invention, and, Figure 4 is a view similar to Figure 3 illustrating still another embodiment of the present invention.

Referring now to the drawings for a more detailed description of the present invention and more particularly to Figure 1 thereof, reference characters 10 and 11 designate two rotatable devices or engines having driven shafts 12 and 13 which may be connected directly, or through suitable clutches, with the driving members of engines 10 and 11 so as to rotate at the same speed as that of the related engines or at a speed proportional thereto.

Each of the engines 10 and 11 has associated therewith generators 14 and 15 which may comprise permanently magnetic rotors 16 and 17 driven directly from shafts 12 and 13, and stators having three-phase windings 18 and 19 electrically associated with the rotors whereby during rotation of rotors 16 and 17, by engines 10 and 11, voltages are generated in the three-phase windings 18 and 19, each being 120° out of phase with the others, and the frequency of reversal of the magnetic fields of the windings corresponding to the speed of rotation of the respective engines.

Furthermore, the three-phase windings 18 and 19 of the generator stators are connected by way of suitable leads 20 and 21 with the three-phase stator windings 22 and 23 of synchronous indicator motors 24 and 25 which have inductively associated therewith rotors 26 and 27, respectively.

The frequency of the magnetic field reversal of the generator windings communicated to the motor stator windings determines the speed of rotation of rotors 26 and 27 as is well known in the art.

Permanent magnets 28 and 29 are rotated at the speed of rotors 26 and 27 by virtue of connections 30 and 31 therewith, while drag cups 32 and 33 of non-magnetic material, carried by indicator shafts 34 and 35, are associated with magnets 28 and 29 for angular displacement thereby, by virtue of eddy currents generated therein during rotation of magnets 28, 29, against the resilient constraint of calibrated springs 36 and 37. Shafts 34 and 35 are provided with concentric pointers 38 and 39 superimposed for movement over a graduated dial 40 whereby readings of the speeds of the engines may be obtained from their related pointer in revolutions per minute.

Figure 2 illustrates a practical embodiment of the dual indicator, shown schematically in Figure 1 for purpose of clarity, which comprises a casing 41 having its open end closed by a cover glass exposing to view the dial 40 together with the pointers 38 and 39 which are concentric with each other.

The foregoing described apparatus constitutes a pair of electrical tachometers which are separate and distinct from each other except for the fact that their respective pointers are mounted concentrically for movement over a common dial. As is known to those skilled in the art, the generators of these tachometers generate voltages, the frequencies of which are a direct function of the speeds of the engines whose speeds it is desired to ascertain, and the voltages so generated energize the indicator motors whereby related pointers are operated through magnetic drag devices to indicate the speed of the engines in question.

As pointed out hereinabove, the tachometer systems described have limited accuracy in that pointers 38 and 39 may actually coincide on dial 40 to indicate the same speed for each engine, whereas, in fact, engine 11 actually may be leading engine 10 by some twenty or twenty-five revolutions per minute.

In order to overcome the foregoing disadvantages, the novel electrical interconnection of the tachometer systems, constituting the subject matter of the present invention, is now provided and comprises an electrical impedance member 42 connected by way of a lead 43 across like points of the three-phase stator windings 22 and 23 of the indicator motors.

As long as the speeds of engines 10 and 11 are equal the two pointers 38 and 39 coincide and indicate a speed value corresponding to the speed of the two engines. This is true for the reason that the whole system maintains its phase and voltage relationships, hence, the motors of the indicators run at uniform speed.

Soon as engine 11 begins to speed up, however, the system no longer maintains constant phase and voltage relationships. Hence, the indictator motors speed up and slow down once per cycle difference and pointers 38 and 39 are caused to oscillate relative to each other. The greater the speed increase, the greater the frequency of oscillation of pointer 39 becomes. The number of oscillations of pointer 39 per minute will be a measure of the speed difference between the two engines.

Thus, the pilot or operator need only to adjust his throttle until such time as pointers 38 and 39 coincide and no longer "beat." This condition, then, informs the pilot that the two engines are in synchronism, that is, their speeds of rotation are the same.

Although Figure 1 shows but one impedance 42 in the electrical connection between the two indicator motors, the same results may be attained by adding a second impedance 44 connected by a lead 45 to the same point of motor 24 that impedance 42 is connected thereto, and to a second point of the windings of motor 25, as shown in Figure 3, or a third impedance 46 may be provided in a lead 47 connecting the third point of motor 25 and a related point of motor 24, in addition to the arrangement of Figure 3. Any one or more of the above described impedances 42, 44 and 46 will produce the desired result and it is to be understood that any combination of resistances, capacities or inductances may constitute the desired impedance.

Under certain conditions, test observations have disclosed that in addition to providing a desirable synchroscope by the coupling of the tachometers through one or more impedances, the present arrangement will act to cause the pointer, corresponding to the engine having an increased speed, to oscillate first and lead the other pointer. In this manner, the leading pointer indicates which engine is running faster.

It will be readily apparent to those skilled in the art that a novel and desirable apparatus for indicating the speed relation between a plurality of engines has been provided which is simple in construction and by which tachometers already installed on aircraft may be readily converted into a reliable and accurate synchroscope by connecting the tachometers through one or more electrical impedances.

Although several embodiments of the present invention have been illustrated and described in detail, it is to be expressly understood that the invention is not limited thereto. Various changes may be made in the design and arrangement of parts without departing from the spirit and scope of the invention, as will now be understood by those skilled in the art. For a definition of the limits of the invention, reference will be had primarily to the appended claims.

I claim:

1. Means for indicating the speed relationship between two engines comprising a generator operated by one of said engines for generating voltages at a frequency corresponding to the speed of rotation of said one engine, a synchronous motor comprising a stator energized by the energy output of said generator and a rotor in inductive relation with said stator, indicating means actuated by said rotor to indicate the speed of rotation of said one engine, a second generator operated by the other of said engines for generating voltages at a frequency corresponding to the speed of rotation of said other engine, a second synchronous motor comprising a stator energized by the energy output of said second generator and a rotor in inductive relation with said last-named stator, indicating means actuated by said second rotor to indicate the speed of rotation of said other engine, and impedance means interconnecting said stators whereby upon a speed variation of one engine relative to the other of said engines said indicating means are caused to oscillate thereby indicating the amount of speed variation.

2. Means for indicating the speed relationship between two engines comprising a generator operated by one of said engines for generating voltages at a frequency corresponding to the speed of rotation of said one engine, a synchronous motor comprising a three-phase stator connected to and energized by the energy output of said generator and a rotor in inductive relation with said stator, means comprising a pointer actuated by said rotor to indicate the speed of rotation of said one engine, a second generator operated by the other of said engines for generating voltages at a frequency corresponding to the speed of rotation of said other engine, a second synchronous motor comprising a three-phase stator connected to and energized by the energy output of said second generator and a rotor in inductive relation with said last-named stator, means comprising a pointer actuated by said second rotor to indicate the speed of rotation of said other engine, and impedance means electrically interconnecting said stators whereby upon a speed variation of one of said engines relative to the other of said engines said pointers are caused to oscillate thereby indicating the speed variation of said engines.

3. Means for indicating the speed relationship between two engines comprising a first generator operated by one of said engines for generating voltages at a frequency corresponding to the speed of rotation of said one engine, a synchronous motor comprising a three-phase stator connected to and energized by the energy output of said generator and a rotor in inductive relation with said stator, means comprising a pointer actuated by said rotor to indicate the speed of rotation of said one engine, a second generator operated by the other of said engines for generating voltages at a frequency corresponding to the speed of rotation of said other engine, a second synchronous motor comprising a three-phase stator connected to and energized by the energy output of said second generator and a rotor in inductive relation with said last-named stator, means comprising a pointer actuated by said second rotor to indicate the speed of rotation of said other engine, and an electrical impedance comprising a resistor connected across said stators whereby upon a speed variation of one engine relative to the other of said engines said pointers are caused to oscillate.

4. Means for indicating the speed relationship between two engines comprising a first generator operated by one of said engines for generating voltages at a frequency corresponding to the speed of rotation of said one engine, a synchronous motor comprising a three-phase stator connected to and energized by the energy output of said generator and a rotor in inductive relation with said stator, means comprising a pointer actuated by said rotor to indicate the speed of rotation of said one engine, a second generator operated by the other of said engines for generating voltages at a frequency corresponding to the speed of rotation of said other engine, a second synchronous motor comprising a three-phase stator connected to and energized by the energy output of said second generator and a rotor in inductive relation with said last-named stator, means comprising a pointer actuated by said second rotor to indicate the speed of rotation of said other engine, and a plurality of electrical impedances interconnecting said stators whereby upon a speed variation of one engine relative to the other of said engines said pointers are caused to oscillate.

5. Means for indicating the speed relationship between two engines comprising a generator operated by one of said engines for generating voltages at a frequency corresponding to the speed of the corresponding engine, a synchronous motor comprising a three-phase stator connected to and energized by the energy output of said generator and a rotor in inductive relation with said stator, means comprising a pointer actuated by said rotor to indicate the speed of rotation of said one engine, a second generator operated by the other of said engines for generating voltages at a frequency corresponding to the speed of said other engine, a second synchronous motor comprising a three-phase stator connected to and energized by the energy output of said generator and a rotor in inductive relation with said last-named stator, means comprising a second pointer concentric with said first pointer and actuated by said second rotor to indicate the speed of rotation of said other engine, and resistance means connected across like points of the two stators whereby upon a speed variation of one of said engines relative to the other of said engines said pointers are caused to oscillate relative to each other.

6. An indicating system for indicating the speed relationship between two engines comprising an electric tachometer for each of said engines, each tachometer comprising a generator and a polyphase motor connected thereto together with indicating means actuated by the motor for indicating the speed of rotation of the related engine, the generator of each tachometer generating voltages at a frequency corresponding to the speed of its corresponding engine for energizing and actuating its related motor and indicating means, and impedance means electrically interconnecting each tachometer motor whereby the indicating means are oscillated relative to each other when the speed of one of said engines increases relative to the speed of the other of said engines.

7. An indicating apparatus for indicating the speed relationship between two engines comprising an electric tachometer for each of said engines, each tachometer comprising a generator and a polyphase motor connected thereto together with a pointer actuated by the motor for indicating the speed of rotation of the related engine, the generator of each tachometer generating voltages at a frequency corresponding to the speed of its corresponding engine for energizing and actuating its related motor and pointer, said tachometer pointers being arranged concentric with each other, and impedance means electrically interconnecting said tachometer motors whereby the pointers are caused to oscillate relative to each other when the speed of one of said engines increases relative to the speed of the other of said engines.

PAUL F. BECHBERGER.